United States Patent [19]

Beicht

[11] Patent Number: 5,706,557
[45] Date of Patent: Jan. 13, 1998

[54] SPRING BAND HOSE CLAMP

[75] Inventor: Bernd Beicht, Gross-Umstadt, Germany

[73] Assignee: Rasmussen GmbH, Maintal, Germany

[21] Appl. No.: 736,357

[22] Filed: Oct. 23, 1996

[30] Foreign Application Priority Data

Oct. 24, 1995 [DE] Germany ............ 195 39 440.2

[51] Int. Cl.$^6$ ............................................. B65D 63/00
[52] U.S. Cl. .................... 24/20 R; 24/20 CW; 24/20 EE
[58] Field of Search ............................ 24/20 R, 20 EE, 24/20 CW, 23 B, 23 EE, 20 TT, 20 S

[56] References Cited

U.S. PATENT DOCUMENTS

| | | | |
|---|---|---|---|
| 2,374,541 | 4/1945 | Hartman. | |
| 4,523,352 | 6/1985 | Wachter | 24/20 TT |
| 4,674,720 | 6/1987 | Fetsch | 24/23 EE |
| 4,773,129 | 9/1988 | Muhr | 24/20 R |
| 4,802,261 | 2/1989 | Mizukoshi et al. | |
| 4,930,191 | 6/1990 | Takahashi et al. | |
| 4,996,749 | 3/1991 | Takahashi | 24/20 R |
| 5,414,905 | 5/1995 | Kimura et al. | 24/20 TT |

FOREIGN PATENT DOCUMENTS

| | | |
|---|---|---|
| 0 657 675 A2 | 10/1994 | European Pat. Off.. |
| 2 596 468 | 3/1986 | France. |
| 1 675 703 | 7/1965 | Germany. |
| 1 955 253 | 2/1967 | Germany. |
| 30 43 108 | 7/1982 | Germany. |
| 38 18 953 | 12/1989 | Germany. |
| 44 41 439 | 5/1996 | Germany. |
| 1-22481 | 4/1989 | Japan. |
| 35278 | 2/1995 | Japan. |
| 198077 | 8/1995 | Japan. |
| 198078 | 8/1995 | Japan. |
| 2235948 | 3/1991 | United Kingdom ............ 24/20 CW |
| 2 266 12 | 4/1993 | United Kingdom. |

*Primary Examiner*—Victor N. Sakran
*Attorney, Agent, or Firm*—Darby & Darby

[57] ABSTRACT

A clamp for hoses, pipes and the like which is intended to prevent leakage due to expansion of the clamp by increased internal pressures. The clamp has a clamping band with two ends. When the clamp is installed and in a generally unstressed condition, a projection on one end is spaced from an abutment on the other end. As internal pressure increases, the clamp expands until the projection engages the abutment. Further expansion is prevented.

19 Claims, 2 Drawing Sheets

SPRING BAND HOSE CLAMP

FIELD OF THE INVENTION

This invention concerns a spring band clip comprising an annularly bent spring band having a central portion, a first end portion and a second end portion, wherein the end portions overlap in an overlap region. Associated with each end portion is a clamping jaw which is disposed in the peripheral direction between the central portion and the clamping jaw of the respective other end portion.

BACKGROUND OF THE INVENTION

Spring band clips of this kind are used for example in motor vehicles to make a connection between a liquid carrying hose and a tubular connection portion. Connections of this kind are to be found for example in cooling and heating systems of motor vehicles.

Spring band clips of this kind are known for example from DE 30 43 108 A1 or DE 19 55 253U. For fitting, i.e. mounting or installing a spring band clip of this kind, the clamping jaws are pressed together, for example by means of a pair of pliers. That causes expansion of the spring band clip, that is to say it causes an increase in its diameter, so that the clip can be pushed on to the hose. At the same time, the clamping jaws prevent overstretching of the spring band clip when it is stressed and the clamping jaws bear against each other. The hose which is thus provided with the spring band clip is then pushed on to the tubular connection portion. After the clamping jaws are released the spring band clip springs back again towards its rest position and thereby clamps the hose fast by an annular gripping action on the tubular connection portion. As an alternative thereto, it is also possible for the spring band clip to be placed on to the tubular connection portion first, followed by the hose. The spring band clip is then fitted on to the hose, which has been pushed on to the tubular connection portion, and released.

Spring band clips of this kind have proven their worth in many situations of use because of their simple fining options and their high degree of reliability. Problems occasionally arise however when an increased internal pressure is formed in the tubular connection portion or the hose. Under some circumstances increased internal pressure may result in expansion of the hose and therewith also expansion of the spring band clip so that the connection becomes leaky. In order to prevent this, the spring band clips must then be designed to be so strong as to afford a relatively high surface pressure. On the hoses to be sealed, that results in increased setting characteristics, which have a disadvantageous influence on the service life of the hose connection. In addition, in order to be able to fit the spring band clip on the hose, an increased force must be applied during the fining operation to overcome the higher level of clamping stress involved.

The invention is based on the problem of being able to ensure fluid-tightness of a connection, even in relation to higher internal pressures.

In a spring band clip of the kind set forth in the opening part of this specification, this problem is solved in that the first end portion, in addition to its clamping jaw, has a projection which at least in the tangential direction engages behind an abutment projecting on the second end portion substantially radially with respect to the spring band, and is of such an arrangement and configuration that it substantially prevents expansion due to internal pressure of the spring band clip when it is clamped fast on a hose.

In that respect use is made of the realization that, upon an enlargement of the spring band clip due to the occurrence of an internal pressure, the displacement of the two end portions relative to each other is substantially tangential or in the peripheral direction. In contrast, a different kinematic situation can be forced to occur when fitting the spring band clip if the two clamping jaws are pressed against each other. In that case the movement of the two end portions of the spring band clip is not unconditionally only tangential relative to each other. On the contrary, it is also possible to incorporate a radial component. If thus the purely tangential movement of the end portions of the spring band clip is prevented, expansion of the spring band clip due to internal pressures which occur is blocked. If such internal pressures occur and the spring band clip is enlarged, the projection eventually comes to bear against the abutment. This reliably prevents further expansion of the spring band clip and the connection between the hose and the tubular connection portion remains fluid-tight. Thus higher surface pressures on the hose in normal operation are not required, avoiding undesirable compression effects on the hose. The increased setting characteristics are avoided.

The term 'first' and 'second' end portion only serves to distinguish the two end portions. Those two expressions are readily interchangeable.

Preferably in the unstressed condition there is a predetermined spacing between the projection and the abutment. The term "unstressed condition" is used to denote both the condition which the spring band clip assumes when it is fined on to a hose of a nominal diameter corresponding to that of the spring band clip, with the tubular connection portion inserted therein, and also the non-installed condition. On the one hand, fitting is made easier by virtue of that spacing. In the fitting operation the projection and the abutment can be moved past each other without the projection first having to be lifted away from the abutment. In the installed condition the spacing permits a small movement of the end portions of the spring band clip relative to each other, which is useful for example for compensating for tolerances. In many cases it is only in the course of time that the hose 'correctly' seats itself on the tubular connection portion, so that even then the connection can be kept fluid-tight, by virtue of the small spacing.

Preferably the spacing is of an order of magnitude in the range of 0.5 to 4 mm. That spacing is on the one hand sufficiently small to prevent excessive expansion of the spring band clip when internal pressures occur. On the other hand it is sufficiently large to guarantee the above-mentioned options in regard to fining and the subsequent behavior of the hose on the tubular connection portion.

Preferably the abutment and/or the projection are formed integrally with the spring band. That makes production easier. There is no need to make any additional connections between the abutment or the projection and the spring band. In addition, that design configuration makes it possible to achieve a relatively high level of reliability because the abutment and the projection are held fast on the spring band with the necessary firmness.

Preferably the abutment is formed by the clamping jaw of the one end portion. That also makes manufacture of the spring band clip easier, but is also of use in regard to fitting the spring band clip. On the one hand, there is no need to provide additional portions on the spring band clip. On the other hand, by virtue of that arrangement, when the clamping jaws are pressed together, at the same time the abutment and the projection can be moved relative to each other in such a way that they do not impede each other.

That is of advantage in particular when the projection is arranged adjacent the clamping jaw of the other end portion.

3

In that case the projection can relatively easily move past the abutment in the fitting operation.

It is also preferable for the projection to be in the form of part of the clamping jaw of the other end portion. This arrangement also affords the desired kinematic situation in regard to fitting the spring band clip, that is to say the abutment and the projection can be guided past each other in the fitting operation, with relatively simple operating measures. In the installed condition when only internal pressures act on the spring band clip the spring band clip is prevented from expanding by the projection and abutment bearing against each other.

Preferably the first end portion extends through a slot in the second end portion. That arrangement ensures that, when the spring band clip is loaded by an internal pressure which would result in radial expansion, the two end portions are not displaced relative to each other in the axial direction. On the contrary the first end portion is then held fast in the axial direction in the second end portion.

In that respect it is preferable for the projection to be directed axially inwardly into the slot. That facilitates manufacture of the spring band clip. When producing the slot, it is possible simply to allow the projection to remain, that is to say it is not also removed when producing the slot, for example by stamping. As however the other end portion is passed through the slot, that affords the desired blocking effect to prevent a purely tangential movement, in a really simple manner.

It is also preferable to provide two projections which are directed axially inwardly into the slot from mutually opposite sides. That affords a certain symmetry, that is to say when internal pressures occur the first end portion is held fast in such a way that it cannot tilt.

In an advantageous embodiment the abutment has an inclined flank which faces the projection. That configuration provides for tangential contact of the projection and the abutment against each other. The contact surface between the abutment and the projection can also carry forces in a radial direction. With this arrangement, radial expansion of the spring band clip is not only prevented by tangential movement of the end portions being blocked. On the contrary radial expansion is also directly prevented.

In another alternative the projection on the first end portion is in the form of a radially projecting tongue which is directed towards the inside of the closed end of the slot. This alternative configuration can also be relatively easily produced. The tongue can be stamped out of the other end portion and can then be bent up. When the two end portions spring back into their rest position the end with the slot then snaps over the tongue and thus is arrested.

At least one clamping jaw is advantageously formed by the front end of an end portion. That arrangement makes it better to control the movement of the clamping jaw. The projection can therefore be better guided past the abutment.

That is the case in particular when the front end is at a radial spacing relative to the outside diameter in the nominal width. In this case it is also possible to engage under the clamping jaw, that is to say the front end of the end portion, in the radial direction, and then correspondingly move it in the radial direction in order to guide the projection over the abutment.

It is also advantageous if the projection is at a spacing of at least 60° in the peripheral direction from the clamping jaw of the first end portion. In that case a relatively long lever arm is available so that the radial movement of the abutment over the projection (or vice-versa) can be produced by using slight forces.

4

BRIEF DESCRIPTION OF THE DRAWINGS

The invention is described hereinafter by means of preferred embodiments with reference to the accompanying drawing in which.

DETAILED DESCRIPTION OF THE INVENTION

Figure 1:
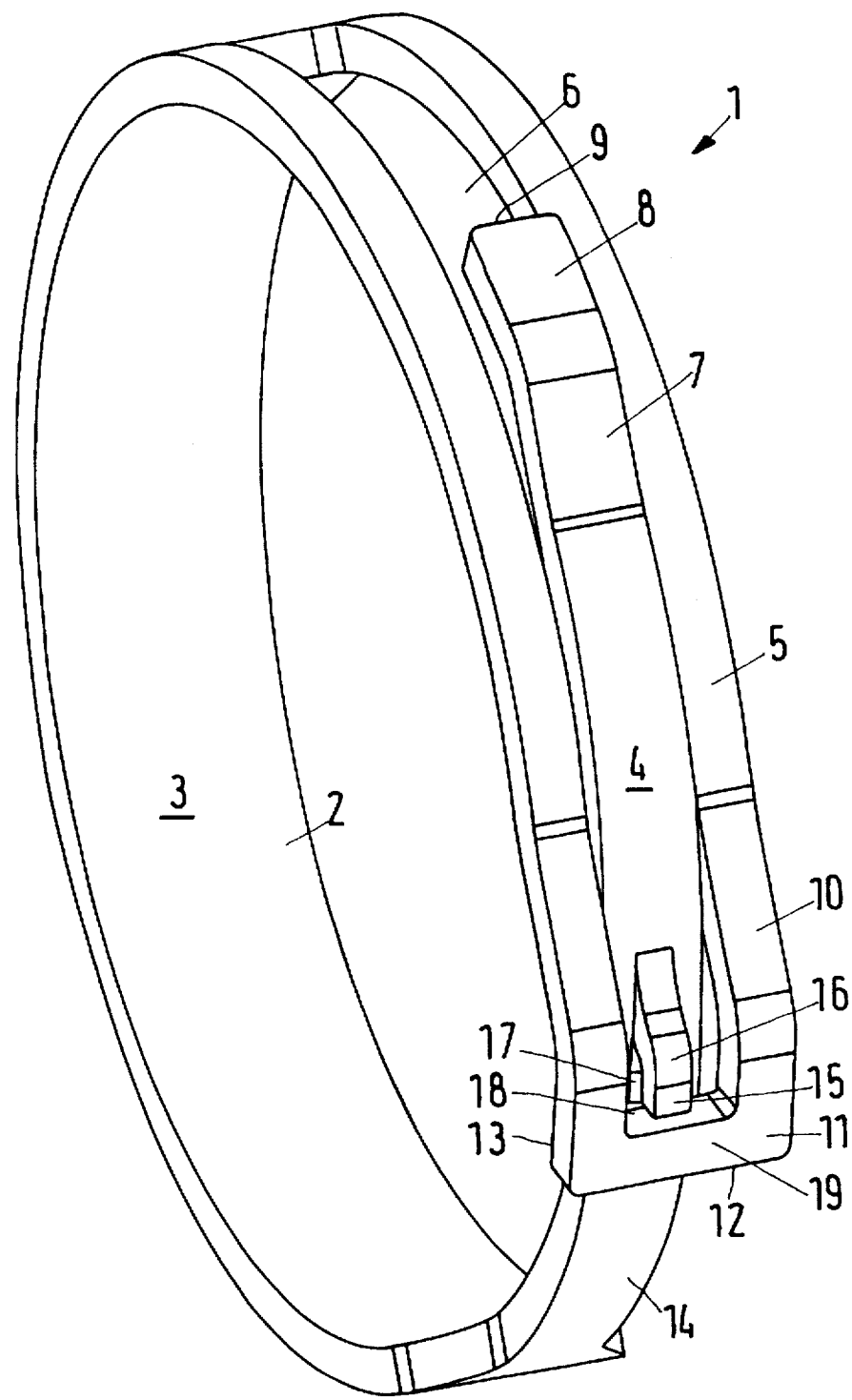
FIG. 1 is a perspective view of a first embodiment of a clamping clip.

A spring band clip 1 comprises a spring band 2 which is annularly bent. The spring band 2 has a central portion 3, a first end portion 4 and a second end portion 5, the two end portions 4, 5 adjoining the central portion. The end portions 4, 5 overlap each other in an overlap region. For that purpose the first end portion 4 is guided through a slot 6 in the second end portion 5.

At its end remote from the central portion 3 the first end portion 4 has a ramp 7 which is radially inclinedly bent away outwardly. Adjoining the ramp 7 is a band portion 8 which is again oriented substantially parallel to the periphery of the spring band clip 1. Accordingly, the front end of the band portion 8 extends substantially radially relative to the spring band clip 1. The front end of the band portion 8 thus forms a clamping jaw 9 to which a tool can be fitted for fitting the spring band clip 1.

In the same manner the second end portion 5 also has a ramp 10 which is inclined radially outwardly relative to the spring band clip 1. Adjoining the ramp 10 is a band portion 11 whose front end extends substantially radially relative to the spring band clip 1 and forms a clamping jaw 12.

At least the band portion 11 is taken radially outwardly by the ramp 10 to such an extent that its radial inside surface 13 is at a small spacing relative to the peripheral surface 14 of the spring band clip near its central portion 3.

Arranged in the first end portion 4 is a projection 15 which is disposed at the tip of a tongue 16 which is bent out of the first end portion 4. For that purpose the first end portion 4 has a stamped-out opening 17.

The projection 15 engages behind an abutment 18 which is formed by the closed end 19 of the second end portion 5.

It cannot be seen from the perspective view that there is a small spacing which is of the order of magnitude of about 0.5 to 4 mm between the projection 15 and the abutment 18 in the unstressed condition.

The co-operation of the projection 15 and the abutment 18 prevents the two end portions 4, 5 from moving tangentially relative to each other in the event of a pressure being applied to the spring band clip 1 from the inside. More specifically, when such a movement occurs, the projection 15 comes to bear against the abutment 18 and thereby blocks further movement.

In contrast, fitting of the spring band clip 1 is still possible, even if in that case expansion of the spring band clip is required. Such expansion is produced by a procedure whereby, when pressing the clamping jaws 9, 12 together, the abutment 18 is moved radially somewhat outwardly and is then moved over the projection 15. That movement can be assisted by virtue of the fact that a tool which is used to press the clamping jaws 9, 12 together engages under the second end portion 5 at the inside 13 of the band portion 11 and then pulls it radially somewhat outwardly.

When the clamping jaws 9, 12 are released the two end portions 4, 5, by virtue of the spring force of the spring band clip 1, move back again into their starting position (or at least in the direction towards same if a hose is to be clamped fast), in which case the closed end 19 slides over the tongue 16 and then springs radially inwardly again. That increases the level of safeguard against expansion of the spring band clip 1 by internal pressures in operation. It will be appreciated that the spring band clip 1 does not have to involve a higher level of spring force for that purpose.

In the design configuration shown in FIG. 1 the projection 15 is at a spacing of at least 60° in the peripheral direction from the clamping jaw 9 of the first end portion 4. That makes relatively long spring travel available, which facilitates fitting of the clip.

Figure 2:
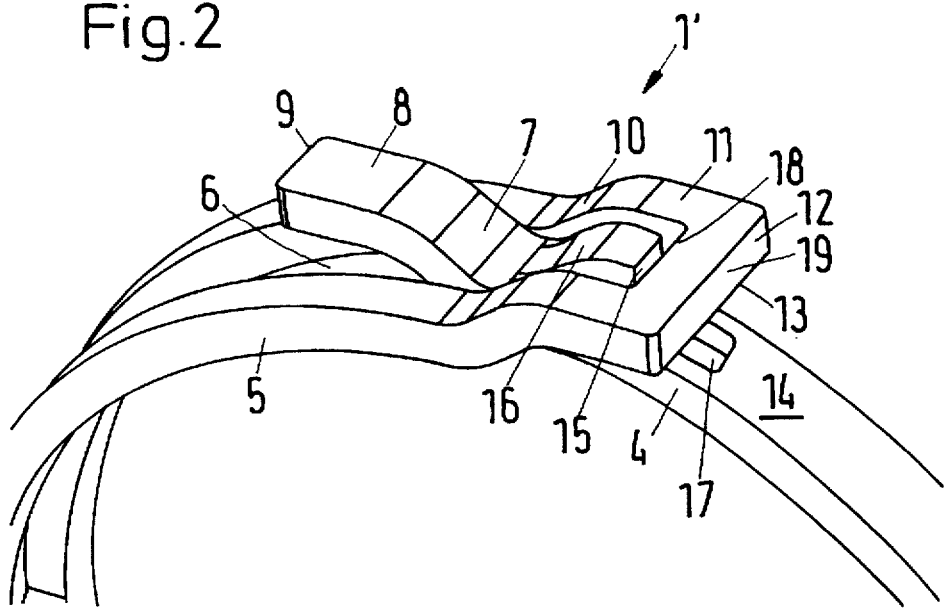
FIG. 2 shows a detail view of a second embodiment.

In the embodiment shown in FIG. 2 in which parts corresponding to those in FIG. 1 are denoted by the same reference numerals, the abutment 15 of the spring band clip 1' is moved closer to the clamping jaw 9 of the first end portion 4. The spacing between the projection 15 and the abutment 18 can be better seen here. Otherwise the structure and the mode of operation are the same as in the case of the spring band clip 1 shown in FIG. 1.

Figure 3:
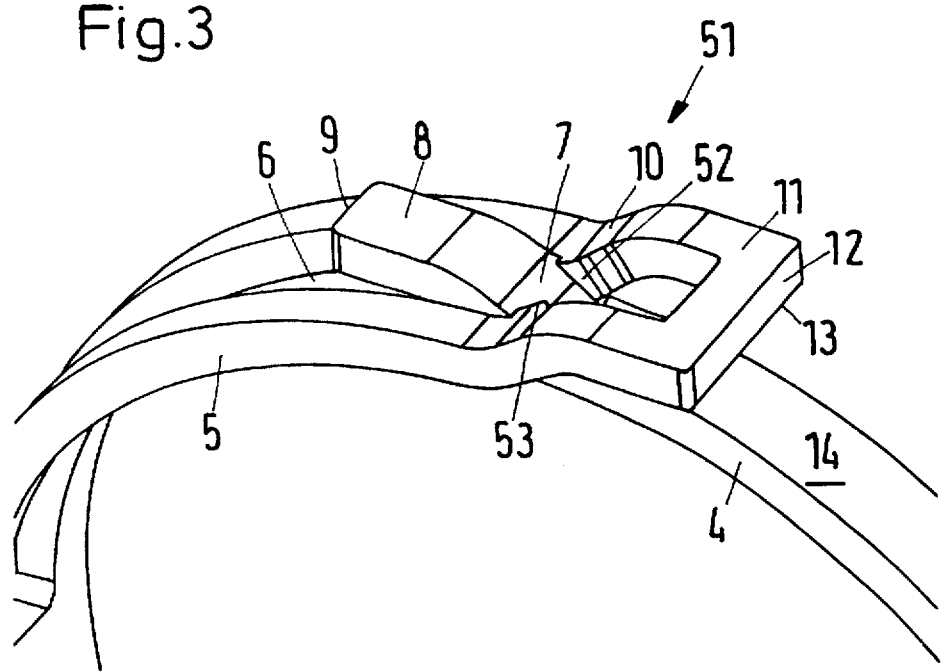
FIG. 3 shows a detail view of a third embodiment.

FIG. 3 shows an alternative configuration of a spring band clip 51 in which parts which correspond to those of FIG. 1 are denoted by the same reference numerals.

The embodiment of the spring band clip 51 is modified in comparison with the spring band clip 1 shown in FIG. 1 in that the abutment is now formed by the ramp 7 of the first end portion 4. In contrast, provided on the second end portion 5 are two projections 52, 53 which are directed axially inwardly into the slot 6, more specifically, from mutually opposite sides. Those two projections 52, 53 bear against the ramp 7 when there is an endeavor to expand the two end portions 4, 5 by a pressure acting from the inside radially outwardly. In that situation the co-operation of the projections 52, 53 with the ramp not only prevents the two end portions 4, 5 from being displaced tangentially relative to each other, but also prevents movement of the first end portion 4 radially relative to the second end portion 5.

For fitting purposes, using a suitable tool which can engage for example the inside 13 of the band portion 11, the band portion 11 is moved both radially and also tangentially when the two clamping jaws 9, 12 are pressed together. In that situation the two projections 52, 53 slide over the surface of the ramp 7 and possibly of the band portion 8 so as to cause expansion of the spring band clip 51, as is required for the fitting operation. When the clamping jaws 9, 12 are released, the end portions 4, 5 move back into their illustrated starting position again under the effect of the spring force of the spring band 2. Expansion in the contrast is prevented if now a pressure acts on the spring band from the inside.

In all embodiments the projections 15, 52, 53 and the abutments 18, 7 are formed integrally with the spring band 2. They can equally be produced, for example, in production of the spring band clip 1, 1', 51 by stamping and/or bending.

What is claimed is:

1. A spring band clip comprising an annularly bent spring band having a central portion, a first end portion and a second end portion, wherein the end portions overlap in a stressed condition and in an unstressed condition in an overlap region, and associated with each end portion is a clamping jaw which is peripherally disposed between the central portion and the clamping jaw of the respective other end portion, the first end portion having a projection which, at least in the tangential direction, is provided to engage an abutment on the second end portion, such that, when the clip is clamped fast on a hose, engagement of the projection on the abutment substantially prevents expansion of the spring band clip caused by internal pressure.

2. The spring band clip according to claim 1 wherein in the unstressed condition there is a predetermined spacing between the projection and the abutment.

3. The spring band clip according to claim 2 wherein the predetermined spacing is in the range of 0.5 to 4 mm.

4. The spring band clip according to claim 1 wherein the abutment and/or the projection are formed integrally with the spring band.

5. The spring band clip according to claim 1 wherein the abutment is formed by the clamping jaw of the second end portion.

6. The spring band clip according to claim 1 wherein the projection is arranged adjacent the clamping jaw of the second end portion.

7. The spring band clip according to claim 1 wherein the first end portion extends through a slot in the second end portion.

8. The spring band clip according to claim 7 wherein the slot has a closed end forming the abutment, and the projection on the first end portion is a radially projecting tongue which is directed towards the abutment of the closed end of the slot.

9. The spring band clip according to claim 1 wherein at least one clamping jaw is formed by a front end of one of the end portions.

10. The spring band clip according to claim 9 wherein the clip has an outside diameter, and the front end is at a radial spacing relative to the outside diameter.

11. The spring band clip according to claim 1 wherein the projection is at a spacing of at least 60° in the peripheral direction from the clamping jaw of the first end portion.

12. A spring band clip comprising an annularly bent spring band having a central portion, a second end portion and a first end portion, wherein the end portions overlap in a stressed condition and in an unstressed condition in an overlap region, and associated with each end portion is a clamping jaw which is peripherally disposed between the central portion and the clamping jaw of the respective other end portion, the second end portion having a projection which, at least in the tangential direction, is provided to engage an abutment on the first end portion, such that, when the clip is clamped fast on a hose, engagement of the projection on the abutment substantially prevents expansion of the spring band clip caused by internal pressure and the projection is in the form of part of the clamping jaw of the second end portion.

13. The spring band clip according to claim 12 wherein the first end portion extends through a slot in the second end portion.

14. The spring band clip according to claim 13 wherein the projection is directed axially inwardly into the slot.

15. The spring band clip according to claim 14 wherein there are provided two projections which are directed axially inwardly into the slot from mutually opposite sides.

16. The spring band clip according to claim 15 wherein the abutment and the projections have confronting faces.

17. The spring band clip according to claim 16 wherein the abutment face is an inclined flank.

18. The spring band clip according to claim 12 wherein at least one clamping jaw is formed by a from end of one of the end portions.

19. The spring band clip according to claim 18 wherein the clip has an outside diameter, and the front end is at a radial spacing relative to the outside diameter.

* * * * *